UNITED STATES PATENT OFFICE.

AUGUST BUECHER, OF HEIDELBERG, GERMANY.

RUST-PREVENTIVE PAINT.

SPECIFICATION forming part of Letters Patent No. 552,744, dated January 7, 1896.

Application filed April 26, 1895. Serial No. 547,245. (No specimens.)

*To all whom it may concern:*

Be it known that I, AUGUST BUECHER, a citizen of the German Empire, residing at Heidelberg, Germany, have invented certain new and useful Improvements in Rust-Preventive Paints, of which the following is a specification.

Letters Patent No. 521,600 were granted to me heretofore on June 19, 1894, for a preparation for protecting metals against corrosion, which preparation was applied as a coating to the metallic surfaces and formed a ground for the final coating of oil-paint, so that the oil-paint coating, in connection with the rust-preventing layer underneath, would protect the articles so coated. I have found, however, that all the oil-paints now sold in the market are unsuitable for this purpose, inasmuch as ordinary oil-paints dry on an alkaline ground only with great difficulty and are liable, after some time, to form cracks and bubbles, with the result that they offer no longer a sufficient resistance to moisture. Owing to this drawback my improved anti-corrosive-paint composition was found to be of comparatively little practical value. To avoid the said drawback I employ as a ground coating the mixture of an alkaline glutin solution of finely-ground metallic zinc and calcium carbonate with an alkaline resin solution, in the following proportions: fifteen parts by weight of rosin, such as dammar, copal, galipot, colophony and the like, and one hundred parts by weight of a sodium hydroxide solution of 1.0439 specific gravity are ground together in cold state and are then allowed to stand in a closed vessel until their solution is completed. The solution is then filtered, whereby a clear brown liquid of 1.0588 specific gravity is obtained. This alkaline rosin solution is mixed with the alkaline glutin solution containing equal parts of zinc and calcium carbonate at the ratio of three to seven.

The so-obtained rosin and glutin solution is spread over the metallic surfaces with a brush, and then allowed to dry, which takes place in a few hours. For obtaining this alkaline glutin solution for the ground coating a boiling aqueous solution of glutin is gradually mixed, under continuous stirring, with a hot concentrated mixture of sodium borate and potassium carbonate, which mixture is subjected to slow boiling for about half an hour. The solution is then transferred into a closed vessel, permitted to stand for fourteen days in a cool place, and then filtered through charcoal. A clear non-gelatinous liquid of the specific gravity of 1.0350 is thus obtained. By the application of this ground the moisture, which, by its presence in the pores of the iron, causes the corrosion of the metal, and also, in most cases, the scaling off of the paint, is rendered harmless, as the strong alkaline solution enters into the pores of the metal, alkalizes the moisture therein and deprives it of its oxidizing properties. To this alkaline ground there is applied a coating of paint, consisting of a mixture of lead oxide, manganese peroxide, finely-divided zinc and calcium carbonate, with a liquid consisting of five parts by weight of linseed-oil boiled over manganese peroxide, 2.25 parts by weight of turpentine and 0.25 parts of benzene. Forty parts by weight of this liquid are mixed together with one hundred parts by weight of the powdered paint shortly before use, the mixing-operation being preferably performed with the same brush which is used for painting. Owing to the fact that this paint solidifies within ten hours and becomes too hard to be used as paint, it is not practicable to prepare the paint ready for use, but it is necessary to mix the parts immediately before use.

By the alkaline ground the disadvantages of the turpentine and linseed-oil, both of which are apt to form acids, are counteracted. Unlike the oil-paints in the market, the paint coating hardens within ten hours and becomes, under the influences of the atmosphere, so hard that it can subsequently be removed only by mechanical means. The coating is spread over the metal surfaces in a thin layer, so that when a single coat only is applied sixty grams of paint is sufficient for one square meter. The surfaces so painted can be subjected to the influences of the atmosphere and will resist the changes of temperature without ever scaling off or forming cracks or bubbles. The underlying metallic surfaces will not show, even after protracted exposure to the weather, the least trace of rust, and any polish or luster on the metal will be fully preserved by the coating of paint.

Under normal circumstances one coat of the protecting paint composition will prove sufficient; but in the case of iron structures, which are exposed to atmospheric influences or considerable fluctuations of temperature, it is advisable to apply two coats of the paint.

Having thus described my invention, I claim as new and desire to secure by Letters Patent—

A rust-preventing paint-composition consisting of a mixture of finely divided zinc, calcium-carbonate, lead oxide and manganese, peroxide with a solution of linseed oil, turpentine and benzene, substantially as set forth.

In testimony that I claim the foregoing as my invention I have signed my name in presence of two subscribing witnesses.

AUGUST BUECHER.

Witnesses:
JOHN ENGLER,
CARL LAUENSTEIN.